US009009579B2

(12) United States Patent
Nakaide et al.

(10) Patent No.: US 9,009,579 B2
(45) Date of Patent: Apr. 14, 2015

(54) ADDRESS TRANSLATION CHECKING DEVICE, CENTRAL PROCESSING UNIT, AND ADDRESS TRANSLATION CHECKING METHOD

(75) Inventors: Minoru Nakaide, Tokyo (JP); Shinichi Toda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 139 days.

(21) Appl. No.: 13/806,498

(22) PCT Filed: Jun. 15, 2011

(86) PCT No.: PCT/JP2011/063695
§ 371 (c)(1),
(2), (4) Date: Dec. 21, 2012

(87) PCT Pub. No.: WO2012/039169
PCT Pub. Date: Mar. 29, 2012

(65) Prior Publication Data
US 2013/0104013 A1 Apr. 25, 2013

(30) Foreign Application Priority Data

Sep. 22, 2010 (JP) ................................ 2010-212435

(51) Int. Cl.
*G01R 31/28* (2006.01)
*G06F 11/07* (2006.01)
(Continued)

(52) U.S. Cl.
CPC ........ *G06F 11/0751* (2013.01); *G06F 11/1004* (2013.01); *G06F 12/1009* (2013.01); *G06F 12/1027* (2013.01)

(58) Field of Classification Search
CPC ............ G06F 11/1004; G06F 12/1027; G06F 11/0751; G06F 12/1009; G06F 11/1016; G06F 11/1064; G06F 12/0862; G06F 2212/654; G06F 2212/651; G06F 12/1063; G06F 12/0802; G06F 12/109; G06F 12/1458; G06F 2212/656; G06F 12/1491; G06F 12/1483

See application file for complete search history.

(56) References Cited

U.S. PATENT DOCUMENTS 4,896,257 A * 1/1990 Ikeda et al. .................... 711/202
5,784,709 A * 7/1998 McLellan et al. ............. 711/207
(Continued)

FOREIGN PATENT DOCUMENTS

CN 1722046 1/2006
JP 4-338847 11/1992
(Continued)

OTHER PUBLICATIONS

International Search Report issued Aug. 2, 2011 in corresponding International (PCT) Application No. PCT/JP2011/063695.
(Continued)

*Primary Examiner* — Guerrier Merant
(74) *Attorney, Agent, or Firm* — Wenderoth, Lind & Ponack, L.L.P.

(57) ABSTRACT

An information processing apparatus includes an MMU that translates between a virtual address and a physical address on the basis of a translation table for translation between physical addresses that are addresses in physical memory and virtual addresses that are addresses in virtual memory. Stored in a RAM are page table information indicating a page table, as well as error detection information attached to the page table information for detecting the presence or absence of an error in translation between a virtual address and a physical address performed by the MMU. A CPU detects the presence or absence of an error in translation between a virtual address and a physical address performed by the MMU on the basis of the error detection information.

7 Claims, 6 Drawing Sheets

(51) Int. Cl.
*G06F 11/10* (2006.01)
*G06F 12/10* (2006.01)

(56) References Cited

U.S. PATENT DOCUMENTS

| | | | | |
|---|---|---|---|---|
| 6,609,181 B2* | 8/2003 | James et al. | ............ | 711/156 |
| 6,901,540 B1* | 5/2005 | Griffith et al. | ............ | 714/48 |
| 7,366,829 B1* | 4/2008 | Luttrell et al. | ............ | 711/108 |
| 8,806,177 B2* | 8/2014 | Krieger et al. | ............ | 712/207 |
| 2004/0015753 A1 | 1/2004 | Patella et al. | | |
| 2004/0117590 A1* | 6/2004 | Arimilli et al. | ............ | 711/203 |
| 2006/0015748 A1 | 1/2006 | Goto et al. | | |
| 2010/0250853 A1* | 9/2010 | Krieger et al. | ............ | 711/122 |

FOREIGN PATENT DOCUMENTS

| | | |
|---|---|---|
| JP | 5-151104 | 6/1993 |
| JP | 5-165730 | 7/1993 |
| JP | 9-223070 | 8/1997 |
| JP | 10-289158 | 10/1998 |
| JP | 11-175409 | 7/1999 |
| JP | 2000-122906 | 4/2000 |
| JP | 2004-054936 | 2/2004 |
| JP | 2004-178639 | 6/2004 |
| JP | 2005-196680 | 7/2005 |
| JP | 2006-18528 | 1/2006 |
| JP | 2006-39968 | 2/2006 |

OTHER PUBLICATIONS

Notification of Reasons for Refusal issued Nov. 5, 2013 in corresponding Japanese Application No. 2010-212435 (with English translation).
Decision of Rejection issued Feb. 4, 2014 in corresponding Japanese Application No. 2010-212435 (with English translation).
Decision to Grant a Patent issued Jun. 10, 2014 in corresponding Japanese Application No. 2010-212435.
Decision to Grant a Patent issued Jul. 25, 2014 in corresponding Korean Application No. 10-2012-7033474.
European Search Report issued Jan. 23, 2015, in corresponding European Application No. 11826615.4.
Chinese Office Action for Chinese Application No. 201180031504.4, issued Nov. 4, 2014 (with English translation).

* cited by examiner

ADDRESS TRANSLATION CHECKING DEVICE, CENTRAL PROCESSING UNIT, AND ADDRESS TRANSLATION CHECKING METHOD

TECHNICAL FIELD

The present invention relates to an address translation checking device, a central processing unit, and an address translation checking method.

BACKGROUND OF INVENTION

Background Art

A CPU (Central Processing Unit) may use virtual addresses in order to access physical memory, such as RAM (Random Access Memory), divided into pages (each having a size of several kilobytes, for example). Virtual addresses are addresses in virtual memory that virtualizes non-contiguous areas in physical memory as contiguous areas, and are therefore different from physical addresses. When the CPU uses virtual addresses, a memory management unit (hereinafter referred to as an MMU) translates the virtual addresses into physical addresses to allow the CPU to access the physical memory.

The MMU reads (loads) a page table, which is a translation table for translating physical addresses into virtual addresses, from RAM into a translation lookaside buffer (hereinafter referred to as a TLB). The MMU uses the page table to translate a virtual address requested to be accessed by the CPU into a physical address.

As shown in a block diagram of FIG. 6, a page table includes memory page entries for accessing respective pages of a physical memory 50. In each memory page entry, a virtual address and a physical address of a corresponding memory page are written. Necessary memory page entries are read from page table information stored in the physical memory 50 into a TLB 54 provided in an MMU 52, and stored in the TLB 54.

Also written in each memory page entry is a memory protection attribute indicating "read," "write," "execute," etc. A technique described in Patent Literature 1 involves setting a value for a protection bit of the memory protection attribute of a memory page entry of a page table to be read into an MMU. This enables preventing a global variable used by only one task from being rewritten by another task to cause a runaway of the task.

CITATION LIST

Patent Literature

{PTL 1}
Japanese Unexamined Patent Application, Publication No. Hei10-289158

SUMMARY OF INVENTION

A CPU 56 may fail to perform a normal access to the physical memory 50 via the MMU 52 for a reason such as corruption of the page table read into the TLB 54 of the MMU 52 shown in the block diagram of FIG. 6, or a failure in the MMU 52. The CPU 56 may then cause a malfunction, such as a hang-up or runaway of the CPU 56 or sudden changes in values output to other connected devices.

The present invention has been made in view of such circumstances. An object of the present invention is to provide an address translation checking device, a central processing unit, and an address translation checking method that are capable of checking, while another program remains running, whether or not the central processing unit can perform a normal access to physical memory using a translation table read into a buffer provided in a memory management unit.

To solve the above problem, an address translation checking device of the present invention employs the following solutions.

An address translation checking device according to a first aspect of the present invention includes: a memory management unit that translates between a virtual address and a physical address on the basis of a translation table for translation between physical addresses that are addresses in physical memory and virtual addresses that are addresses in virtual memory, the memory management unit being provided with a buffer for storing translation table information indicating the translation table; a storage unit provided outside the memory management unit and that stores the translation table information and error detection information attached to the translation table information, the error detection information being for detecting the presence or absence of an error in translation between a virtual address and a physical address performed by the memory management unit; and an error detection unit that detects the presence or absence of the error on the basis of the error detection information.

According to this configuration, the memory management unit translates between a virtual address and a physical address on the basis of the translation table for translation between physical addresses that are addresses in the physical memory and virtual addresses that are addresses in the virtual memory. The buffer provided in the memory management unit stores the translation table information indicating the translation table for use in the translation.

The physical memory may be RAM, for example, and the virtual memory is memory that virtualizes non-contiguous areas in the physical memory as contiguous areas. When the central processing unit uses virtual addresses, the memory management unit translates between virtual addresses and physical addresses on the basis of the translation table because the physical memory cannot be directly accessed with virtual addresses. This translation allows the central processing unit to access the physical memory.

Before being read into the buffer provided in the memory management unit, the translation table information is stored in the storage unit provided outside the memory management unit. The error detection information for detecting the presence or absence of an error in translation between a virtual address and a physical address performed by the memory management unit is attached to the translation table information and stored in the storage unit.

On the basis of the error detection information, the error detection unit detects the presence or absence of an error in translation between a virtual address and a physical address performed by the memory management unit.

Thus, the error detection information attached to the page table information is used to detect the presence or absence of an error in translation between a virtual address and a physical address performed by the memory management unit. Therefore, it can be checked, while another program remains running, whether or not the central processing unit can perform a normal access to the physical memory using the translation table read into the buffer provided in the memory management unit.

In the above first aspect, preferably, the error detection information is a CRC value for use in cyclic redundancy check generated on the basis of the translation table indicated by the translation table information, and the error detection unit generates, before the error detection information is read into the buffer along with the translation table information, a new CRC value on the basis of the translation table indicated by the translation table information to be read and detects whether or not the CRC value as the error detection information is the same as the new CRC value.

According to this configuration, the error detection information is a CRC value for use in cyclic redundancy check generated on the basis of the translation table indicated by the translation table information. The error detection unit generates, before the error detection information is read into the buffer along with the translation table information, a new CRC value on the basis of the translation table indicated by the translation table information to be read, and detects whether or not the CRC value as the error detection information is the same as the new CRC value.

Thus, whether or not the translation table read into the buffer is corrupted can be detected. Therefore, whether or not the central processing unit can perform a normal access to the physical memory can be checked while another program remains running.

In the above first aspect, the error detection information is preferably attached for each page of the translation table.

According to this configuration, since generally the physical memory is divided into pages and the translation table is configured to allow the central processing unit to access the physical memory on a page basis, the error detection information is attached for each page of the translation table.

Thus, whether or not the translation table is corrupted can be checked on a page basis.

In the above first aspect, preferably, a predetermined value is stored at a predetermined physical address in the physical memory, the error detection information is information for translation between the predetermined physical address and a virtual address, and the error detection unit uses the error detection information read into the buffer to read a value stored in the physical memory according to the virtual address corresponding to the predetermined physical address and detect whether or not the read value is the same as the predetermined value.

According to this configuration, a predetermined value is stored at a predetermined physical address in the physical memory, and the error detection information is information for translation between the predetermined physical address and a virtual address.

The error detection unit uses the error detection information read into the buffer to read a value stored in the physical memory according to the virtual address corresponding to the predetermined physical address and detect whether or not the read value is the same as the predetermined value. That is, if the memory management unit can properly translate the input virtual address into the physical address, the read value should be the same as the predetermined value. In contrast, if the memory management unit cannot properly translate the input virtual address into the physical address, the read value should be different from the predetermined value.

Thus, the presence or absence of an error in translation between the virtual memory and the physical memory performed by the memory management unit can be detected. Therefore, whether or not the central processing unit can perform a normal access to the physical memory can be checked while another program remains running.

A central processing unit according to a second aspect of the present invention includes the above-described address translation checking device, wherein, when the error detection unit of the address translation checking device detects an error in translation between a virtual address and a physical address performed by the memory management unit, the central processing unit stops a running program.

According to this configuration, the central processing unit stops a running program when the error detection unit of the address translation checking device detects an error in translation between a virtual address and a physical address performed by the memory management unit.

This can prevent a malfunction of the central processing unit caused by erroneous translation between a virtual address and a physical address performed by the memory management unit.

An address translation checking method according to a third aspect of the present invention is an address translation checking method for a central processing unit that accesses a memory management unit, the memory management unit storing translation table information from an external storage unit into a buffer and translating between a virtual address and a physical address on the basis of the translation table information stored in the buffer, the translation table information indicating a translation table for translation between physical addresses that are addresses in physical memory and virtual addresses that are addresses in virtual memory, the method including, on the basis of error detection information attached to the translation table information for detecting the presence or absence of an error in translation between a virtual address and a physical address performed by the memory management unit, detecting the presence or absence of the error.

According to this configuration, the error detection information attached to the translation table information is used to detect the presence or absence of an error in translation between a virtual address and a physical address performed by the memory management unit. Therefore, it can be checked, while another program remains running, whether or not the central processing unit can perform a normal access to the physical memory using the translation table read into the buffer provided in the memory management unit.

The present invention is highly advantageous in that, while another program remains running, it can be checked whether or not the central processing unit can perform a normal access to the physical memory using the translation table read into the buffer provided in the memory management unit.

DETAILED DESCRIPTION OF INVENTION

An embodiment of an address translation checking device, a central processing unit, and an address translation checking method according to the present invention will be described below with reference to the drawings.

First Embodiment

A first embodiment of the present invention will be described below.

Figure 1:
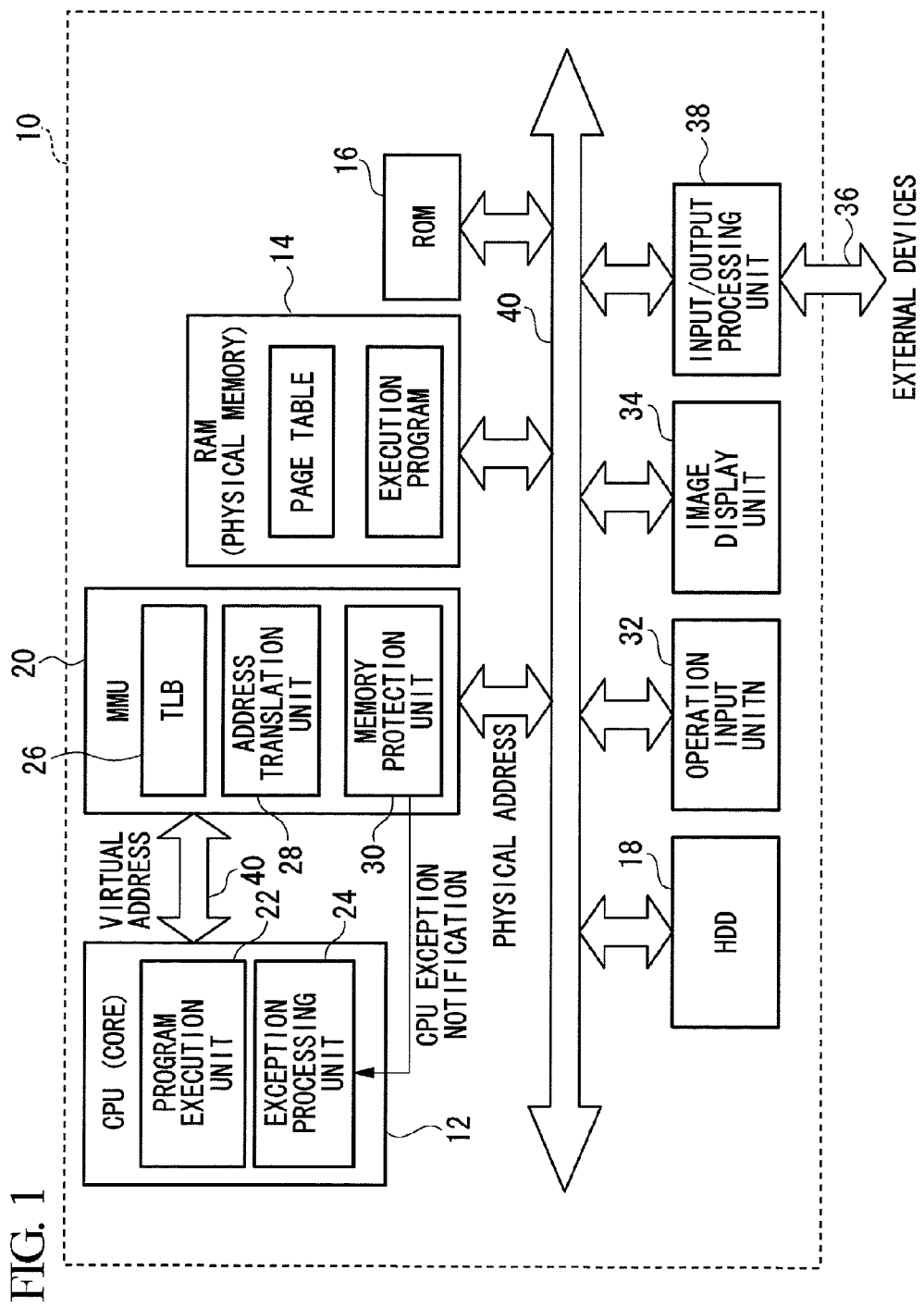
FIG. 1 is a diagram showing main components of an electrical system of an information processing apparatus according to a first embodiment of the present invention.

FIG. 1 is a block diagram showing an electrical configuration of an information processing apparatus 10 according to the embodiment.

The information processing apparatus 10 includes: a CPU 12 controlling the operation of the entire information processing apparatus 10; a RAM 14 serving as physical memory used as, e.g., a work area when the CPU 12 executes various programs; a ROM (Read Only Memory) 16 having stored therein various programs and various sorts of information (data); and an HDD (Hard Disk Drive) 18 serving as storage unit that stores various programs and various sorts of information. The storage unit is not limited to the HDD 18 but may be any storage unit capable of storing data, such as flash ROM.

The CPU 12 includes a program execution unit 22 for executing programs, and an exception processing unit 24 that performs the process of stopping a running program in response to an input of a CPU exception (page fault) notification to be described below.

The CPU 12 is connected to an MMU 20 via an internal bus 40. The MMU 20 translates a virtual address output from the CPU 12 into a physical address on the basis of a translation table for translation between virtual addresses and physical addresses (hereinafter referred to as a "page table").

Figure 2:
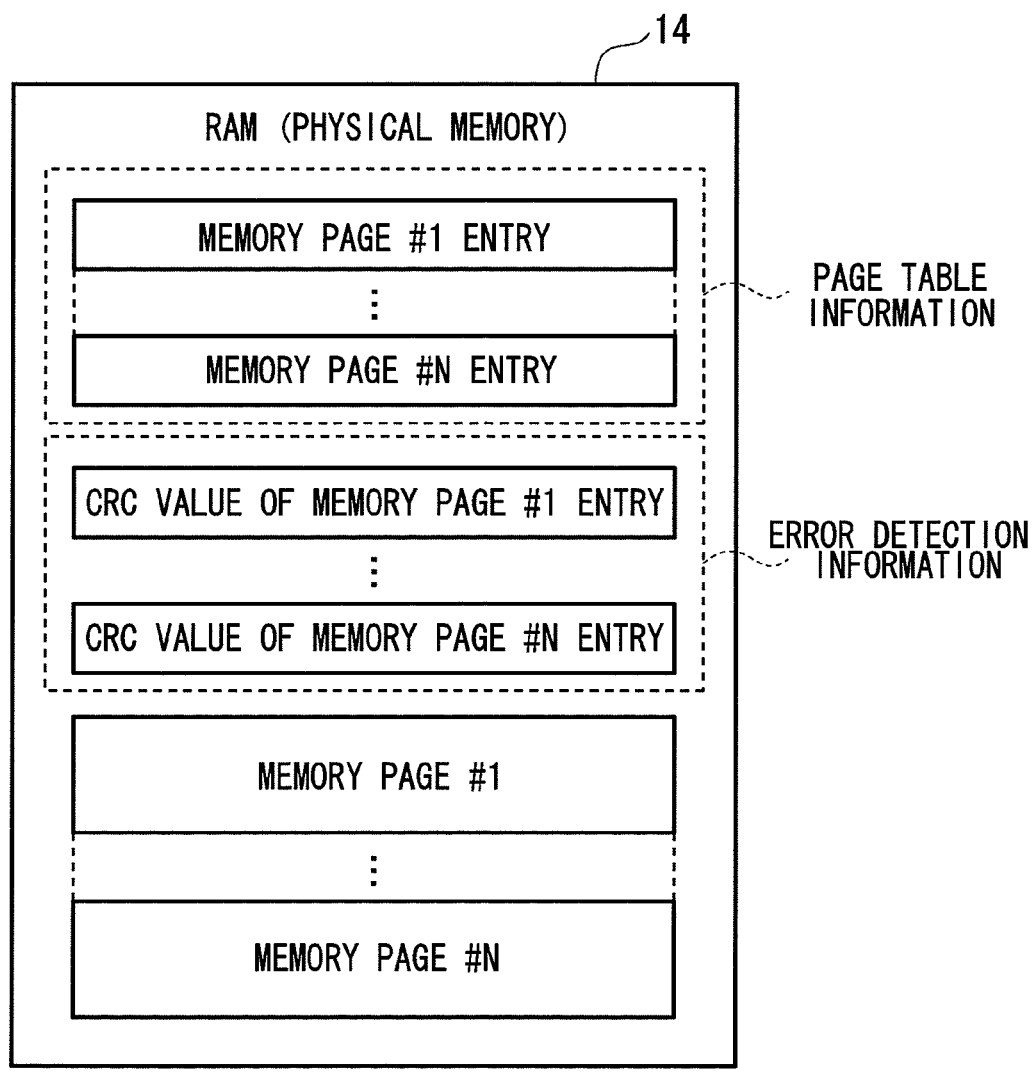
FIG. 2 is a block diagram showing a structure of page table information and error detection information stored in RAM according to the first embodiment of the present invention.

As shown in FIG. 2, the page table includes memory page entries (a memory page #1 entry to a memory page #N entry) provided for respective pages (a memory page #1 to a memory page #N (N is an integer)) of the RAM 14 (physical memory). Written in each memory page entry are a virtual address and a physical address of a corresponding memory page, as well as a memory protection attribute indicating "read," "write," "execute," "super user mode" in which only accesses from a user in full authority are accepted, etc.

The MMU 20 includes a TLB 26, an address translation unit 28, and a memory protection unit 30.

The TLB 26 stores page table information indicating the page table. More specifically, the TLB 26 reads memory page entries required for a program executed by the CPU 12 from page table information stored in the RAM 14, and stores the read memory page entries.

The address translation unit 28 performs the process of translating between virtual addresses and physical addresses using the page table information read into the TLB 26.

The memory protection unit 30 detects any invalid access such that the physical memory cannot be accessed with a physical address resulting from translation of a virtual address by the address translation unit 28. For any detected invalid access, the memory protection unit 30 outputs a CPU exception notification, which is a signal indicating the invalid access, to the CPU 12.

The page table information is stored in the HDD 18 in advance. Upon start of the operation of the information processing apparatus 10, the page table information is sent from the HDD 18 to the RAM 14 and stored therein. The page table information stored in the RAM 14 is read into the TLB 26 according to a program executed by the CPU 12.

The information processing apparatus 10 also includes: an operation input unit 32 implemented by a keyboard, a mouse, etc., and receiving various operational inputs; and an image display unit 34, for example a liquid crystal display device. The operation input unit 32 is not limited to a keyboard or a mouse but may be any input device capable of receiving operational inputs to the information processing apparatus 10, such as push buttons. The image display unit 34 is not limited to a liquid crystal display but may be any display device capable of providing a notification of various sorts of information to a user of the information processing apparatus 10, such as an LED (Light Emitting Diode) device.

The information processing apparatus 10 further includes an input/output processing unit 38 connected via a communication line 36 to external devices, such as other information processing apparatuses and other devices controlled by the information processing apparatus 10, to exchange various sorts of information with the external devices.

The communication line 36 may be a wide-area communication line provided by an electricity utility, a private network such as a LAN (Local Area Network), or an external path. The communication line 36 may be either a wired line or a wireless line.

The MMU 20, the RAM 14, the ROM 16, the HDD 18, the operation input unit 32, the image display unit 34, and the input/output processing unit 38 are electrically connected with each other via the internal bus 40. Accordingly, through the MMU 20, the CPU 12 can access the RAM 14, the ROM 16, and the HDD 18, recognize the state of operations performed on the operation input unit 32, display an image on the image display unit 34, and transmit and receive various sorts of information to and from the external devices via the input/output processing unit 38.

The CPU 12 may fail to perform a normal access to the RAM 14 via the MMU 20 for a reason such as corruption of the page table read into the TLB 26 of the MMU 20, or a failure in the MMU 20. The CPU 12 may then cause a malfunction, such as a hang-up or runaway of the CPU 12 or sudden changes in values output to other connected devices. Therefore, the page table information, as well as error detection information for detecting the presence or absence of an error in translation between a virtual address and a physical address performed by the MMU 20, are read from the RAM 14 into the TLB 26 of the MMU 20 according to the first embodiment.

The error detection information according to the first embodiment is a CRC value for use in cyclic redundancy check generated on the basis of the page table indicated by the page table information. The CRC value may be generated with any conventionally known technique, which will not be described in the first embodiment.

As shown in FIG. 2, the CRC value is provided for each of the memory page entries #1 to #N corresponding to the memory pages #1 to #N of the RAM 14 (physical memory). That is, the CRC value is generated for each page of the RAM 14.

Before the page table information is read into the TLB 26, the CPU 12 according to the first embodiment performs an address translation check process. In the address translation check process, the presence or absence of an error in translation between a virtual address and a physical address performed by the MMU 20 is detected on the basis of the error detection information attached to the page table information.

Now, operation of the information processing apparatus 10 according to the first embodiment will be described.

Figure 3:
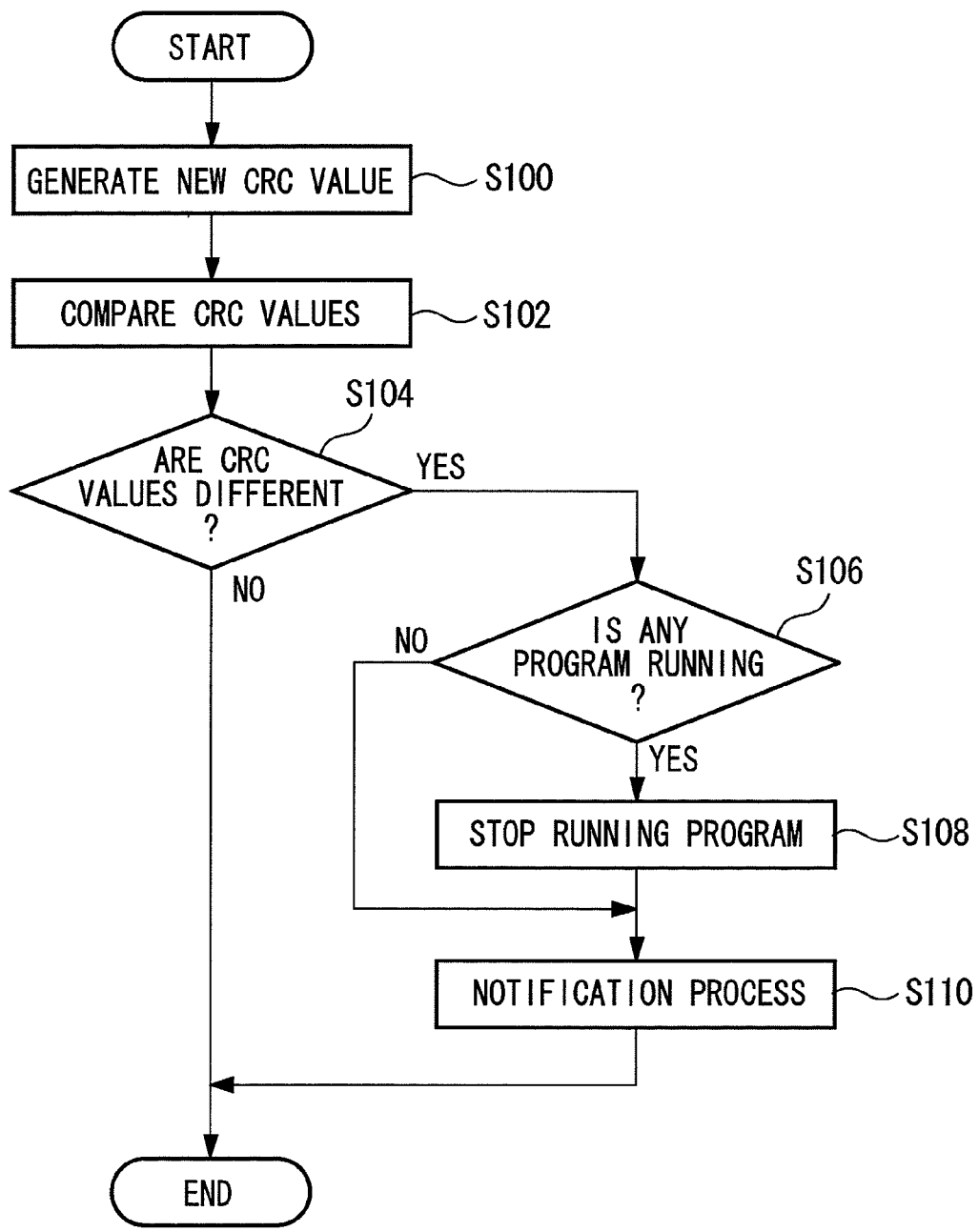
FIG. 3 is a flowchart showing a process flow of an address translation check program according to the first embodiment of the present invention.

FIG. 3 is a flowchart showing a process flow of an address translation check program executed by the CPU 12 before the page table information stored in the RAM 14 is read into the TLB 26 along with the error detection information. The program is stored in advance in a predetermined area of the HDD 18.

In step 100, for each memory page entry of the page table information to be read into the TLB 26, a new CRC value is generated on the basis of the memory page entry.

Next, in step 102, for each memory page entry, a CRC value as error detection information about the page table information to be read into the TLB 26 is compared with the new CRC value generated in step 100.

Next, in step 104, it is determined whether or not the CRC value as the error detection information is different from the new CRC value. If the determination results in YES, the page table information to be read is not read into the TLB 26, and the process proceeds to step 106. If the determination results in NO, the page table information to be read is read into the TLB 26, and the program terminates.

That is, the determination in step 104 resulting in YES means the detection of corruption of page table indicated by the page table information read by the TLB 26 for some reason. The reason of the corruption of the page table may be rewriting of the page table by an errant program, or garbled bits of the page table caused by a temporary error occurring in the RAM 14 due to, for example, radiation.

In step 106, it is determined whether or not any program is running. If the determination results in YES, the process proceeds to step 108. If the determination results in NO, the process proceeds to step 110.

In step 108, the program being executed by the program execution unit 22 is stopped, and the process proceeds to step 110.

In step 110, a notification process is performed. That is, a notification is provided by displaying, on a screen of the image display unit 34, the fact that the page data is corrupted and the name etc. of any stopped program that has been running. The address translation check program then terminates. In the notification process, a notification of a memory page entry detected as involving the corruption may be provided.

The CRC value as the error detection information may be generated and stored in the HDD 18 when the page table information is generated. Alternatively, the CRC value may be generated and updated each time the CPU 12 is initialized, or each time an attribute of the page table are updated.

In particular, if the CRC value is generated and stored in the HDD 18 when the page table information is generated, detection of the difference between the CRC values suggests that the page table have been corrupted during the process of being read from the HDD 18 into the TLB 26 via the RAM 14.

As described above, in the information processing apparatus 10 according to the first embodiment, the MMU 20 translates between a virtual address and a physical address on the basis of the translation table for translation between virtual addresses and physical addresses. The translation table information indicating the translation table is stored in the TLB 26 provided in the MMU 20.

Before being read into the TLB 26, the translation table information is stored in the RAM 14 provided outside the MMU 20. The error detection information for detecting the presence or absence of an error in translation between a virtual address and a physical address performed by the MMU 20 is attached to the translation table information.

The CPU 12 detects, on the basis of the error detection information, the presence or absence of an error in translation between a virtual address and a physical address performed by the MMU 20.

Thus, the CPU 12 according to the first embodiment uses the error detection information attached to the page table information to detect the presence or absence of an error in translation between a virtual address and a physical address performed by the MMU 20. Therefore, it can be checked, while another program remains running, whether or not the CPU 12 can perform a normal access to the physical memory using the page table read into the TLB 26 provided in the MMU 20.

The error detection information according to the first embodiment is a CRC value for use in cyclic redundancy check generated on the basis of the page table indicated by the page table information. Before the page table information is read into the TLB 26, a new CRC value is generated on the basis of the page table indicated by the page table information to be read. It is then detected whether or not the CRC value as the error information is the same as the new CRC value.

Thus, the CPU 12 according to the first embodiment can detect whether or not the page table read into the TLB 26 is corrupted. Therefore, whether or not the CPU 12 can perform a normal access to the physical memory can be checked while another program remains running.

The error detection information according to the first embodiment is attached to each page of the page table. Therefore, whether or not the page table is corrupted can be checked on a page basis.

Further, the CPU 12 according to the first embodiment stops a running program if an error in translation between a virtual address and a physical address performed by the MMU 20 is detected. This can prevent a malfunction of the CPU 12 caused by erroneous translation between a virtual address and a physical address performed by the MMU 20.

Second Embodiment

A second embodiment of the present invention will be described below.

The configuration of the information processing apparatus 10 according to the second embodiment is the same as that of the information processing apparatus 10 according to the first embodiment shown in FIG. 1, and therefore will not be described.

In the second embodiment, a predetermined value (hereinafter referred to as a "magic pattern") is stored at a predetermined physical address of the RAM 14 (physical memory). The error detection information is information for translation between the predetermined physical address and a virtual address.

Figure 4:
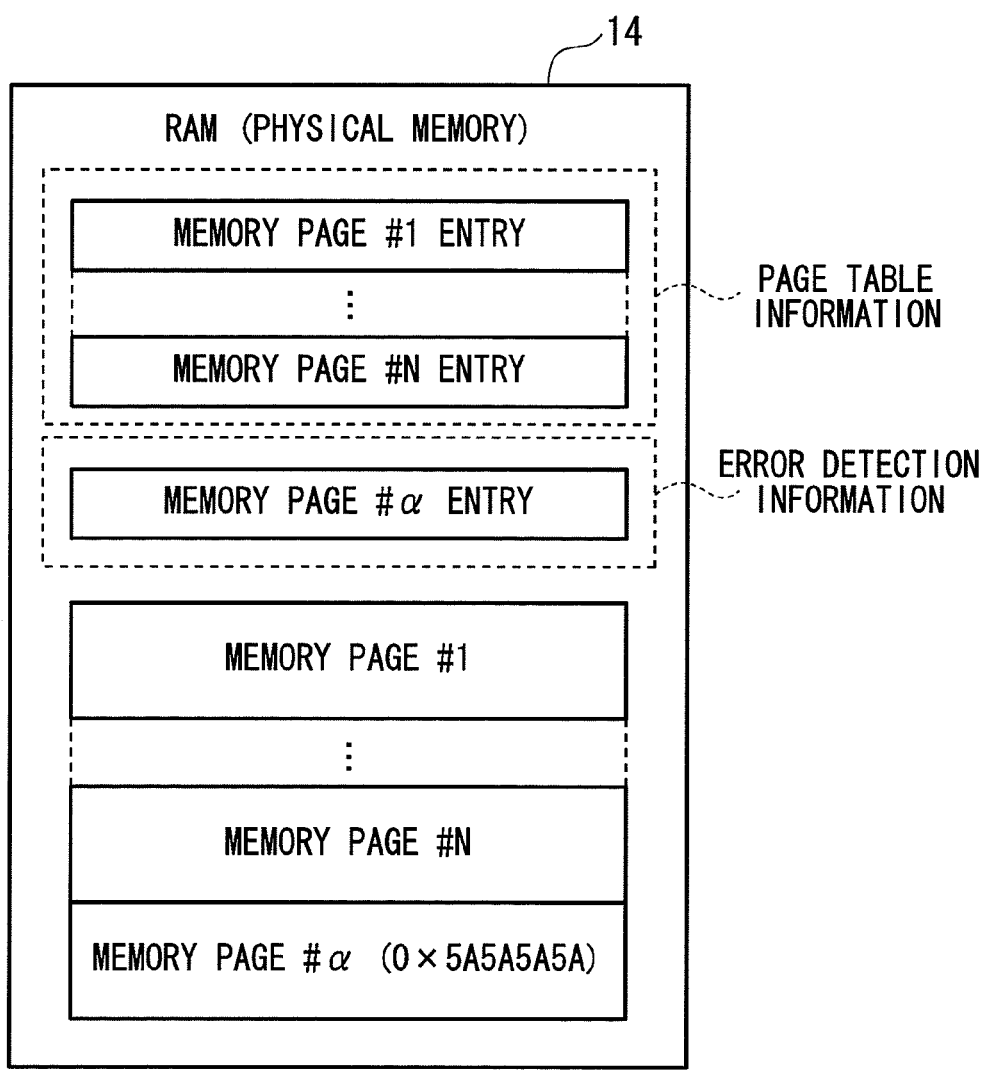
FIG. 4 is a block diagram showing a structure of page table information and error detection information stored in RAM according to a second embodiment of the present invention.

Specifically, as shown in FIG. 4, the error detection information according to the second embodiment is a memory page entry for accessing a memory page #α (α is an integer different from the numbers 1 to N) in which the magic pattern is stored. This memory page entry is attached to the page table information. The memory page #α according to the second embodiment stores 0x5A5A5A5A as an exemplary magic pattern. The same information as the magic pattern stored in the RAM 14 is written in advance in an address translation check program to be described below.

If the information processing apparatus 10 is configured to allow the CPU 12 to write to the RAM 14 without the intervention of the MMU 20, the magic pattern is desirably written to the RAM 14 before the MMU 20 is activated. However, this is not limitation but the magic pattern may be written to the RAM 14 after the MMU 20 is activated.

The magic pattern may be changed at every predetermined time intervals. Also, the physical address at which the magic pattern is written may be changed at every predetermined time intervals.

Now, operation of the information processing apparatus 10 according to the second embodiment will be described.

Figure 5:
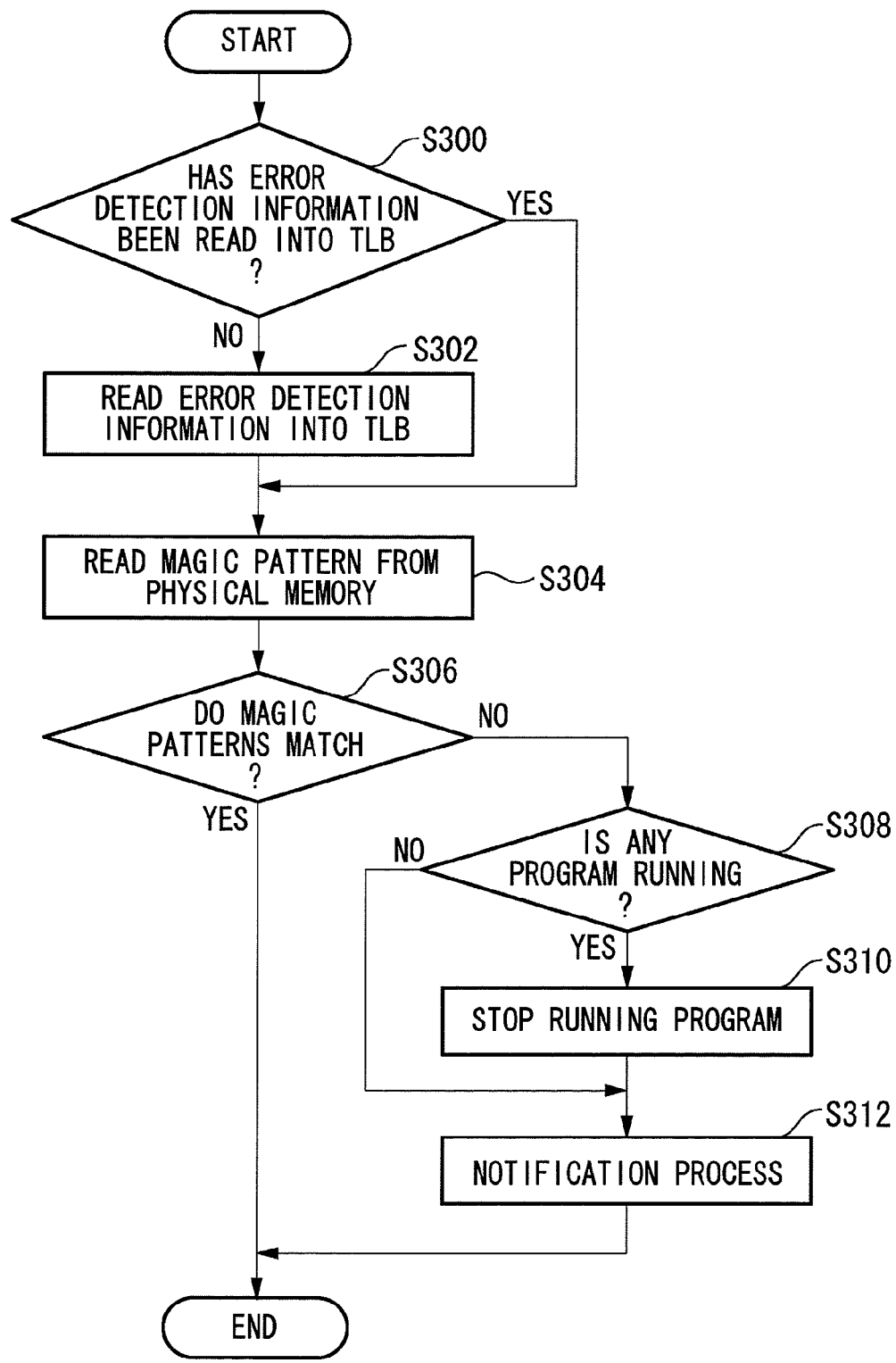
FIG. 5 is a flowchart showing a process flow of an address translation check program according to the second embodiment of the present invention.
Figure 6:
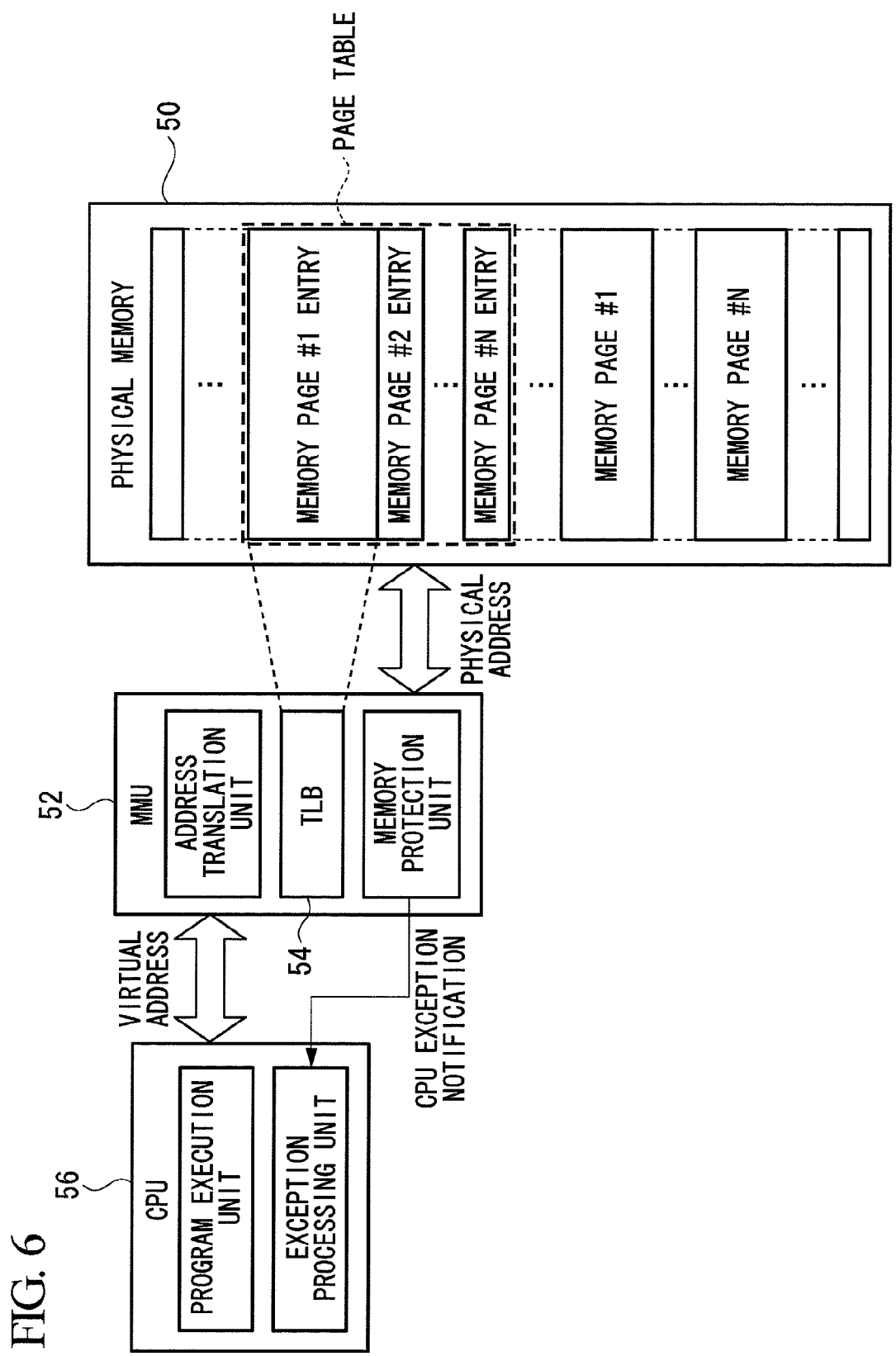
FIG. 6 is a block diagram for describing processing by a conventional MMU.

FIG. 5 is a flowchart showing a process flow of an address translation check program executed by the program execution unit 22 of the CPU 12 in performing an error detection process according to the second embodiment. The program is stored in advance in a predetermined area of the HDD 18. The address translation check program is sent from the HDD 18 to the RAM 14 at predetermined time intervals (for example, every ten minutes) to be stored therein and executed.

In step 300, an access to a virtual address of a memory page entry as the error detection information is attempted to determine whether or not the error detection information has been read into the TLB 26. If the determination results in YES, the process proceeds to step 304. If the determination results in NO, the process proceeds to step 302. That is, if the virtual address cannot be accessed, the error detection information has not been read into the TLB 26. If the virtual address can be accessed, the error detection information has been read into the TLB 26.

In step 302, since the memory page entry as the error detection information has not been read into the TLB 26, the error detection information is read from the RAM 14 into the TLB 26.

In step 304, the virtual address for reading a magic pattern stored in the RAM 14 is output to the MMU 20 and translated into a physical address on the basis of the memory page entry as the error detection information read into the TLB 26. The magic number is then read from the RAM 14.

Next, in step 306, it is detected whether a magic pattern written in advance in the address translation check program is different from the magic pattern read from the RAM 14. That is, in this step, it is determined whether or not the magic pattern written in advance in the address translation check program matches the magic pattern read from the RAM 14. If the determination results in YES, the program terminates. If the determination results in NO, the process proceeds to step 308.

If the MMU 20 has succeeded in properly translating the input virtual address into the physical address, the magic pattern read from the RAM 14 should be the same as the magic pattern written in advance in the address translation check program. In contrast, if the MMU 20 has failed in properly translating the input virtual address into the physical address, the magic pattern read from the RAM 14 should be different from the magic pattern written in advance in the address translation check program. If the magic pattern read from the RAM 14 is different from the magic pattern written in advance in the address translation check program, it suggests an error occurring in the translation between the virtual address and the physical address performed by the MMU 20, that is, a failure occurring in the MMU 20.

In step 308, it is determined whether or not any program is running. If the determination results in YES, the process proceeds to step 310. If the determination results in NO, the process proceeds to step 312.

In step 310, the program being executed by the program execution unit 22 is stopped.

In step 312, a notification process is performed. That is, a notification is provided by displaying, on the screen of the image display unit 34, the fact that the magic patterns do not match each other and the name etc. of any stopped program that has been running. The address translation check program then terminates.

It is to be noted that, if the magic pattern cannot be read from the RAM 14 in step 304 above, the process is continued with the assumption that the magic patterns do not match each other in step 306. That is, if the magic pattern cannot be read from the RAM 14, again, it suggests an error occurring in the translation between the virtual memory and the physical memory performed by the MMU 20, that is, a failure occurring in the MMU 20.

As described above, the information processing apparatus 10 according to the second embodiment stores the magic pattern at a predetermined physical address in the physical memory. The error detection information is information for translation between the predetermined physical address and a virtual address. The CPU 12 according to the second embodiment uses the error detection information read into the TLB 26 to read a value stored in the physical memory on the basis of the virtual address corresponding to the physical address and detect whether the read value is the same as the magic pattern.

Thus, the CPU 12 according to the second embodiment can detect the presence or absence of an error in translation between the virtual memory and the physical memory performed by the MMU 20. Therefore, whether or not the CPU 12 can perform a normal access to the physical memory can be checked while another program remains running.

While the present invention has been described according to the above embodiments, the technical scope of the present invention is not limited to what has been described in the above embodiments. Various modifications and improvements may be made to the above embodiments without departing from the spirit of the present invention, and embodiments involving such modifications and improvements fall within the technical scope of the present invention.

For example, while the RAM 14 serves as the physical memory in the above-described embodiments, the present invention is not limited to this. Rather, the RAM 14 and the HDD 18 may serve as the physical memory.

Also, while the notification is provided through the image display device in the notification process in the above-described embodiments, the present invention is not limited to this. For example, if a printer is connected to the input/output processing unit 28, the notification may be provided by causing the printer to form a written notification as an image on a medium such as paper. Alternatively, the notification may be provided as sound through a speaker (not shown).

REFERENCE SIGNS LIST 10 information processing apparatus
12 CPU
14 RAM
20 MMU
26 TLB
30 memory protection unit

The invention claimed is:
1. An address translation checking device comprising:
a memory management unit that translates between a virtual address and a physical address on the basis of a translation table for translation between physical addresses in physical memory and virtual addresses in virtual memory, the memory management unit being provided with a buffer for storing translation table information indicating the translation table;

a storage unit provided outside the memory management unit and that stores the translation table information and error detection information attached to the translation table information, the error detection information being for detecting the presence or absence of an error in translation between a virtual address and a physical address performed by the memory management unit; and an error detection unit that detects the presence or absence of the error on the basis of the error detection information, wherein a predetermined value is stored at a predetermined physical address in the physical memory, the error detection information is information for translation between the predetermined physical address and a virtual address, and the error detection unit uses the error detection information read into the buffer to read a value stored in the physical memory according to the virtual address corresponding to the predetermined physical address and detect whether or not the read value is the same as the predetermined value.

2. The address translation checking device according to claim 1, wherein the error detection information is a CRC value for use in cyclic redundancy check generated on the basis of the translation table indicated by the translation table information, and the error detection unit generates, before the error detection information is read into the buffer along with the translation table information, a new CRC value on the basis of the translation table indicated by the translation table information to be read and detects whether or not the CRC value as the error detection information is the same as the new CRC value.

3. The address translation checking device according to claim 2, wherein the error detection information is attached for each page of the translation table.

4. A central processing unit comprising the address translation checking device according to claim 1, wherein when the error detection unit of the address translation checking device detects an error in translation between a virtual address and a physical address performed by the memory management unit, the central processing unit stops a running program.

5. An address translation checking method for a central processing unit that accesses a memory management unit, the memory management unit storing translation table information from an external storage unit into a buffer and translating between a virtual address and a physical address on the basis of the translation table information stored in the buffer, the translation table information indicating a translation table for translation between physical addresses in physical memory and virtual addresses in virtual memory, the method comprising for detecting the presence or absence of the error on the basis of error detection information attached to the translation table information for detecting the presence or absence of an error in translation between a virtual address and a physical address performed by the memory management unit, storing a predetermined value at a predetermined physical address in the physical memory, reading a value stored in the physical memory according to the virtual address corresponding to the predetermined physical address by using the error detection information read into the buffer, and detecting whether or not the read value is the same as the predetermined value, wherein the error detection information is information for translation between the predetermined physical address and a virtual address.

6. A central processing unit comprising the address translation checking device according to claim 2, wherein when the error detection unit of the address translation checking device detects an error in translation between a virtual address and a physical address performed by the memory management unit, the central processing unit stops a running program.

7. A central processing unit comprising the address translation checking device according to claim 3, wherein when the error detection unit of the address translation checking device detects an error in translation between a virtual address and a physical address performed by the memory management unit, the central processing unit stops a running program.

* * * * *